United States Patent [19]

Aota et al.

[11] Patent Number: 5,896,515
[45] Date of Patent: *Apr. 20, 1999

[54] INFORMATION PROCESSING APPARATUS

[75] Inventors: Hideyuki Aota, Himeji; Keiichi Yoshioka, Sanda, both of Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/582,670

[22] Filed: Jan. 4, 1996

[30] Foreign Application Priority Data

Jan. 6, 1995 [JP] Japan ................... 7-000898

[51] Int. Cl.$^6$ .................. G06F 9/34; G06F 12/06
[52] U.S. Cl. .................. 395/309; 711/100; 395/308
[58] Field of Search ................... 395/500, 852, 395/834, 800, 569, 405, 402, 842, 291, 387, 698, 652, 24, 568, 800.52, 381, 800.23; 364/DIG. 1, DIG. 2; 711/203, 207

[56] References Cited

U.S. PATENT DOCUMENTS

| 3,737,860 | 6/1973 | Sporer | 395/405 |
| 4,197,578 | 4/1980 | Wada et al. | 395/387 |
| 4,320,454 | 3/1982 | Suzuki et al. | 395/381 |
| 5,129,068 | 7/1992 | Watanabe et al. | 395/421.04 |
| 5,191,404 | 3/1993 | Wu et al. | 257/724 |
| 5,249,280 | 9/1993 | Nash et al. | 395/405 |

FOREIGN PATENT DOCUMENTS

| 3-4995 | 9/1980 | Japan. |
| 3-11035 | 4/1985 | Japan. |
| 4-77399 | 4/1987 | Japan. |
| 414147 | 1/1992 | Japan. |

OTHER PUBLICATIONS

English language abstract of Japanese Publication No. 55-122290.

English language abstract of Japanese Publication No. 60-70590.

English language abstract of Japanese Publication No. 62-75996.

*Primary Examiner*—Daniel H. Pan
*Attorney, Agent, or Firm*—Cooper & Dunham LLP

[57] ABSTRACT

A general-use register set includes a plurality of registers in a central processing unit body. A register-bank memory has memory regions relevant to the plurality of registers and is connected to the central processing unit. An output signal of an address circuit included in the central processing unit is supplied to the register-bank memory. Alternatively, an output signal of a decoding circuit included in the central processing unit may be supplied to the register-bank memory. A signal for selecting either activation or deactivation of the register-bank memory is a signal which indicates a selection of the deactivation of the register-bank memory except in a case where data is written in the general-use register set and a case of a restoration operation after register bank switching. Instead, a signal for selecting either generating or non-generating of a clock signal for the register-bank memory may be a signal which indicates a selection of the non-generation of the clock signal for the register-bank memory except in a case where data is written in the general-use register set and in a case of a restoration operation after register bank switching.

4 Claims, 15 Drawing Sheets

INFORMATION PROCESSING APPARATUS

BACKGROUND OF THE INVENTION

1. Field of the Invention

The present invention relates to an information processing apparatus, in particular, to an information processing apparatus in which data access is performed using a register bank method (see Japanese Laid-Open Patent Application No.4-14147).

2. Description of the Related Art

An information processing apparatus in which data access is performed using the register bank method is, as shown in FIG. 1, provided with a CPU (Central Processing Unit) body 1 and a register-bank memory 2 having a single port. The CPU body 1 and register-bank memory 2 are connected with each other via a special internal address bus, internal data bus 4 and control-signal line 5, other than the data bus and address bus used for connecting with peripheral apparatuses.

The CPU body 1 includes:

a general-use register set (register array) 6 which is made of a plurality of registers;

a special register (CBNR) 7 which specifies bank numbers of the register-bank memory 2;

a bank address buffer 8 which integrates signals, which indicate currently used bank numbers of banks in a memory unit 3 of the register-bank memory 2 and are obtained from the special register 7, with register selection control signals RGS0 through RGSn which indicates register numbers of registers in the banks (ordinary, a plurality of registers being included in a bank), and thus supplies signals RA0 through RAm to the register-bank memory 2;

an address circuit 9 to which the current bank numbers and RGS0 through RGSn are input;

a decoding circuit 10 to which these signals are input from the address circuit 9;

a command control unit 11 which supplies signals including RBCK (control clock signal), RBCE (memory enable signal), RBWEB (read/write control signal) to the register-bank memory 2; and an input/output circuit 12 which sends to and receives from the register-bank memory 2 RB0 through RBn (register data).

The address circuit 9 has, as shown in FIG. 2, circuits including inverters for the RGS0 through RGSn, receives the RGS0 through RGSn, and supplies forward and inverse signals thereof (IA0 through IAn and IA0B through IAnB in FIG. 2). Further, the decoding circuit 10 is, as shown in FIG. 3, made of four-input NAND circuits and inverters, receives output (IA0 through IA3 and IA0B through IA3B in FIG. 3), and supplies decoded signals (RG0 through RG15 in FIG. 3).

The register-bank memory 2 includes:

a memory unit 13;

an address circuit 14 which receives the above-mentioned RA0 through RAm;

a decoding circuit 15 which receives the forward and inverse outputs from the address circuit 14;

a control circuit 16 which receives the above-mentioned signals including RBCK, RBCE and RBWEB and controls the address circuit 14; and an input/output circuit 17 which sends to and receives from the register-bank memory 2 the above-mentioned RB0 through RBn.

The above-mentioned address circuit 14 includes, as shown in FIG. 4, circuits made of a NAND circuit and an inverter, receives from the above-mentioned bank address buffer 8 the RA0 through RAm and supplies the forward and inverse signals thereof (IA0 through IAm and IA0B through IAmB in the figure). Input signals RA0 through RAm relevant to the above-mentioned RGS0 through RGSn in the CPU body 1, and RAn+1 through RAm correspond to the current bank numbers starting from CBNR 7 in the CPU body 1. Further, a signal ICE shown in FIG. 4 is supplied by the control circuit 16 and controls driving of the address circuit 14.

The decoding circuit 15 includes, as shown in FIG. 5, five-input NAND circuits receiving signals from the address circuit 14 and NOR circuits, and receives outputs (IA0B through IA4B and IA0 through IA4 in the figure) from the address circuit 14, and outputs decoded signals (WL0 through WL31 in the figure).

The memory unit 13 includes, as shown in FIG. 6, a memory-cell array unit 13a and a precharging unit 13b, and is provided with a memory space corresponding to a memory space of the general-use register set 6. Further, the memory unit 13 sends to and receives from the decoding circuit the decoded signals (WL0 through WLn−1 in the figure), and sends to and receives from the input/output circuit 17 the signals (BL0 through BLm−1, BLB0 through BLBm−1 in the figure). A signal ICKB shown in the figure is supplied by the control circuit 16 and controls the precharging.

The input/output circuit 17 includes, as shown in FIG. 7, a writing circuit 17a. The input/output circuit 17 sends to and receives from the memory unit 13 the signals (BL0 through BLm−1, BLB0 through BLBm−1), and also sends to and receives from the input/output circuit 12 in the CPU body 1 data (RB0 through RBn). A signal IWE shown in the figure is supplied by the control circuit 16 and controls reading/writing.

The control circuit 16 includes, as shown in FIG. 8, NAND circuits and inverters and receives from the command control unit 11 in the CPU body 1 the signals RBCK, RBCE and RBWEB, and outputs the control signals ICE, ICKB and IWE.

FIG. 9 shows the timing of reading/writing and precharging of the precharging unit 13b in the memory unit 13. When the signal RBCK from the CPU body 1 is at a low level, the signal ICKB is at a high level and all of the memory cells (MC) are thus precharged. When the ICKB is in the high level, none of the signals WL0 through WLn−1 are selected (see FIG. 5). Further, when the signal RBCK is at the high level, according to a current address, one of the signals WL0 through WLn−1 is selected. When, in this state, the signal RBWEB is at the low level, the signal IWE is at the high level and a writing operation is performed on the memory cells. When, in the same state, the signal RBWEB is at the high level, the IWE signal is at the low level and a reading operation is performed on the memory cells. The signal RBCE is maintained to be at the high level during a register accessing operation.

The above-described information processing apparatus in the related art using the register bank method operates as described below.

When the CPU body 1 executes a command and reads data from the registers, data in the general-use register set 6 is read out. At this time, the register-bank memory 2 has the signals RA0 through RAm supplied thereto from the bank address buffer 8 and thus enters a read state. However, the CPU body 1 gives a higher priority to and therefore receives data read from the general-use register set 6, not data read from the register-bank memory 2.

When the CPU body 1 executes a command and writes data to registers, data is written in the general-use register set 6, and simultaneously the same data is written in a memory region, corresponding to a bank number currently being used, of the general-use register set 6, in the register-bank memory 2. For example, when the command to be executed is an adding command (a result of (R2+R15) is stored as R15, that is, 'add: g. 1 r2, r15' in a programming language), after a calculation of (R2+R15) is performed, the result is written in a register R15 of the general-use register set 6 and simultaneously the same result is written in a region for the register R15 in the register-bank memory 2.

Thus, the register-bank memory 2 has data the same as that, which the general-use register set 6 has, in relevant regions thereof.

A case where the information processing apparatus did not use the above-described register bank method will now be considered. In such a case, data currently being stored in the general-use register set 6 and being currently used may be switched to other new data stored in a new bank of externally provided memory. Such an operation may be referred to as register bank switching. When the register bank switching is performed, the data, which is the same as that currently being stored in the general-use register set 6, is written in another bank of externally provided memory. Thus, the data currently being used is saved. Thereby, the other new data stored in the other new bank of externally provided memory can be loaded in the general-use register set 6 and thus the data in the general-use register set can be updated.

In contrast to this, when the register bank method is used, the register-bank memory regularly has data, stored therein, the same as that of the general-use register set 6. As a result, it is not necessary to specially perform the above-mentioned operation of writing the data the same as that currently being stored in the general-use register set 6 so as to save the data. Only the operation of loading the new data in the general-use register set 6 can achieve such bank switching.

However, in the information processing apparatus in which data accessing is performed using the register bank method in the related art, it is necessary to provide in the register-bank memory 2 the address circuit 14 and decoding circuit 15 similar to the address circuit 9 and decoding circuit 10 in the CPU body 1. In order to supply power to the address circuit 14 and decoding circuit 15, required power consumption increases in the register-bank memory 2.

In order to prevent the required power consumption from increasing, a method of dividing a bit line or a word line is known (see Japanese Patent Publication No.3-4995, Japanese Patent Publication No.3-11035 and Japanese Patent Publication No.3-77399). However, in these publications, chip area requirement increases in comparison to a case where a bit line or a word line is divided.

SUMMARY OF THE INVENTION

An object of the present invention is to provide an information processing apparatus in which data accessing is performed using the register bank method but an increase of chip area due to division of a bit line or a work line is prevented and also increase of a required power consumption is also prevented.

An information processing apparatus according to the present invention, comprises:

a general-use register set comprising a plurality of registers in a central processing unit body; and a register-bank memory having memory regions corresponding to said plurality of registers and connected to said central processing unit;

and wherein an output signal of an address circuit included in said central processing unit is supplied to said register-bank memory.

Because the output signal of the address circuit provided in the central processing unit is supplied to the register-bank memory, it is possible to eliminate from the register-bank memory an address circuit which supplies the same output signal. As a result, power consumption and chip area required for this address circuit can be eliminated in the register-bank memory.

Another information processing apparatus according to the present invention comprises:

a general-use register set comprising a plurality of registers in a central processing unit body; and a register-bank memory having memory regions corresponding to the plurality of registers and connected to the central processing unit;

and wherein an output signal of a decoding circuit included in the central processing unit is supplied to the register-bank memory.

Because the output signal of the decoding circuit provided in the central processing unit is supplied to the register-bank memory, it is possible to eliminate from the register-bank memory an address circuit and a decoding circuit which supply the same output signal. As a result, power consumption and chip area required for the address circuit and decoding circuit can be eliminated in the register-bank memory.

It is preferable that a signal for selecting one of activation and deactivation of said register-bank memory is a signal which indicates a selection of the deactivation of the register-bank memory except in a case where data is written in the general-use register set and in a case of a restoration operation after register bank switching.

Thereby, it is possible to reduce the required power consumption. The reason therefor will now be described. For example, in the related art, as described above, in a case of an ordinary data reading from the general-use register set, a reading operation is performed on the register-bank memory and on the general-use register set, and read data from the general-use register set is given higher priority to be received by the CPU body. Thus, a wasteful power consumption occurs in the reading operation performed on the register-bank memory. However, according to the present invention, the register-bank memory is deactivated in such a case. Thus, wasteful power consumption can be eliminated.

Instead, it is preferable that a signal for selecting one of generating and non-generating a clock signal for the register-bank memory is a signal which indicates a selection of the non-generation of the clock signal for the register-bank memory except in a case where data is written in said general-use register set and in a case of restoration operation after the register bank switching.

Thereby, it is possible to reduce the required power consumption. The reason therefor will now be described. For example, in the related art, as described above, in a case of an ordinary data reading from the general-use register set, a reading operation is performed on the register-bank memory and on the general-use register set, and read data from the general-use register set is given higher priority to be received by the CPU body. Thus, a wasteful power consumption occurs in the reading operation performed on the register-bank memory. However, according to the present invention, the register-bank memory is deactivated in such a case. Thus, wasteful power consumption can be eliminated.

Further, it is also preferable that:

the register-bank memory is divided into a plurality of modules; and the information processing apparatus further comprises module selecting means which deactivates a module of the plurality of modules, the module to be deactivated being one which is not currently accessed.

A required chip area may increase due to provision of two modules of register-bank memory. However, only the module of banks including a bank which is currently accessed is activated and the other module is not activated. Accordingly, it is possible to reduce power consumption.

Other objects and further features of the present invention will become more apparent from the following detailed description when read in conjunction with the accompanying drawings.

DESCRIPTION OF PREFERRED EMBODIMENTS

An information processing apparatus in a first embodiment of the present invention will now be described with reference to FIG. 10. In the description, figures the same as those used in the description of the related art are used for identical parts.

Figure 10:
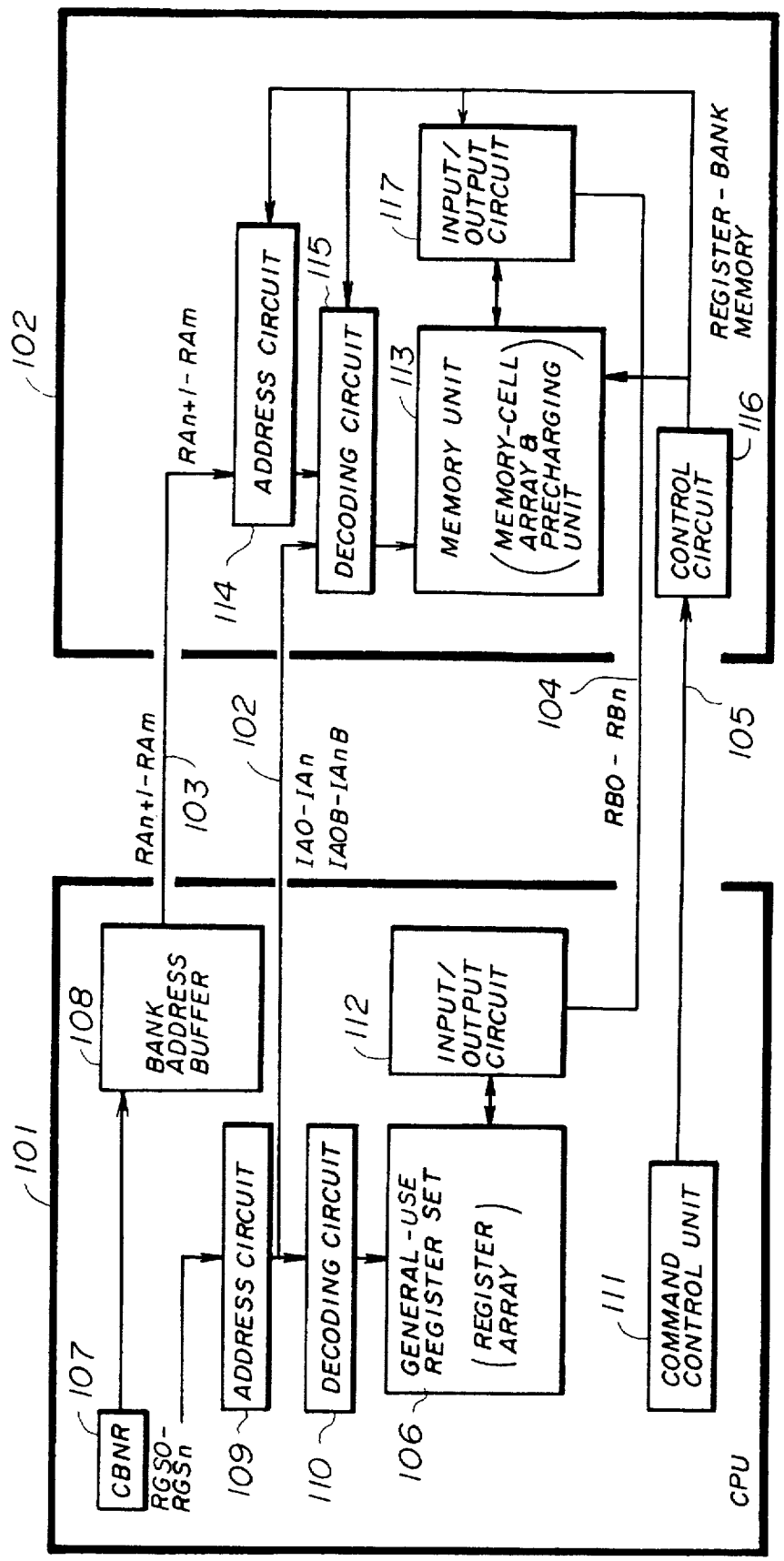
FIG. 10 shows a block diagram of an information processing apparatus in a first embodiment of the present invention.

This information processing apparatus is, as shown in FIG. 10, provided with a CPU (Central Processing Unit) body 101 and a register-bank memory 102 having a single port. The CPU body 101 and register-bank memory 102 are connected with each other via special internal address bus 103, internal address-signal bus 120, internal data bus 104 and control-signal line 105, other busses being used for connecting with peripheral apparatuses. The register-bank memory 102 is a memory which is used as complementary or optional storage means of the general-use register set 106 in the CPU body 101. By externally providing such a register-bank memory, it is possible to effectively reduce a size of a general or basic structure of the CPU body.

The CPU body 101 includes:

a general-use register set (register array) 106 which comprises a plurality of registers;

a special register (CBNR) 107 which specifies bank numbers of the register-bank memory 102;

a bank address buffer 108 which supplies signals RAn+1 through RAm, which indicate currently used bank numbers of banks in a memory unit 113 of the register-bank memory 102 and are obtained from the special register 107, to the register-bank memory 102;

an address circuit 109 which receives register selection control signals RGS0 through RGSn which indicates register numbers of registers in the banks (ordinary, a plurality of registers being included in a bank);

a decoding circuit 110 to which these signals are input from the address circuit 109;

a command control unit 111 which supplies signals including RBCK (control clock signal), RBCE (memory enable signal), RBWEB (reading/writing control signal) to the register-bank memory 102; and an input/output circuit 112 which sends to and receives from the register-bank memory 102 RB0 through RBn (register data).

Figure 2:
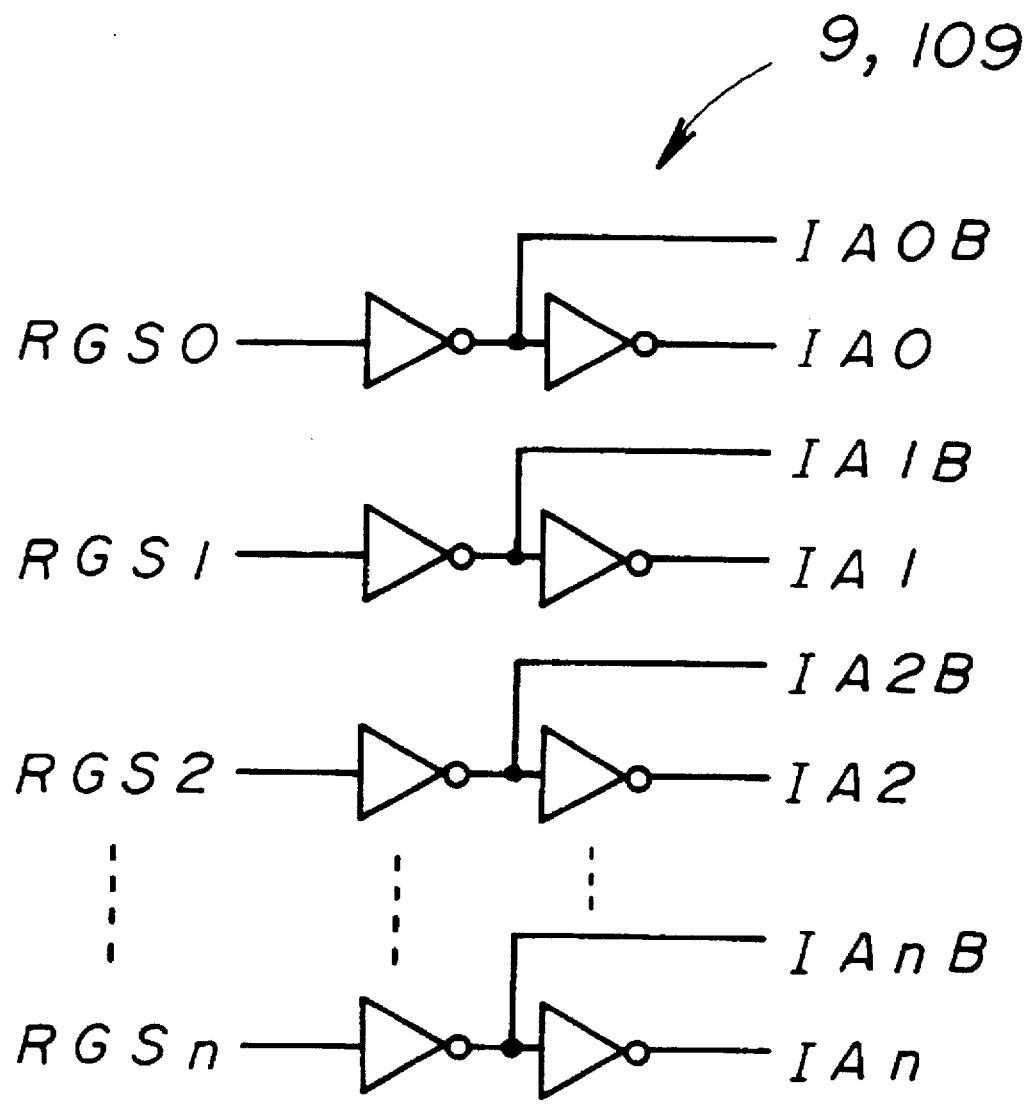
FIG. 2 shows a circuit diagram of an address circuit in a CPU body shown in each of FIGS. 1 and 10.
Figure 3:
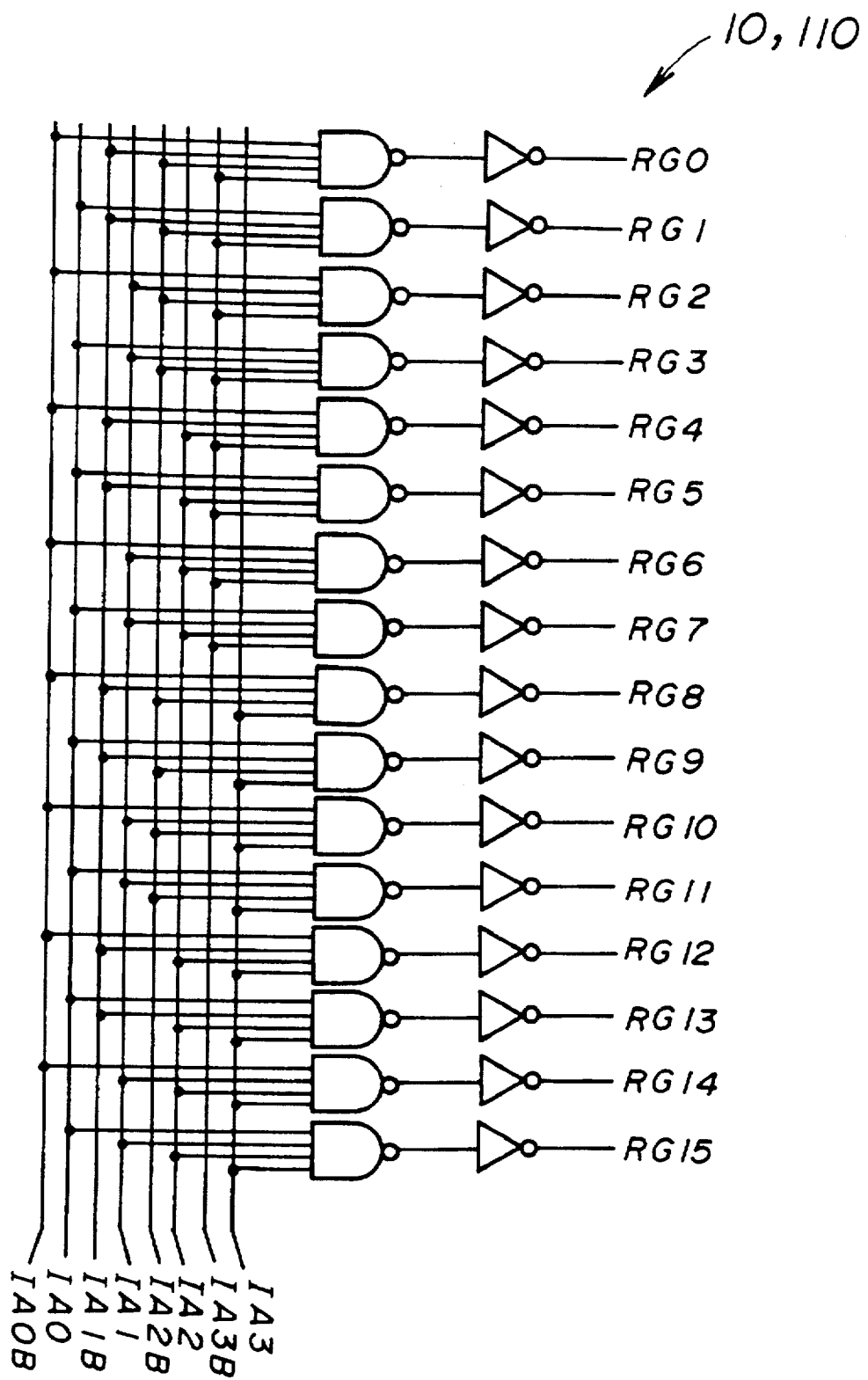
FIG. 3 shows a circuit diagram of a decoding circuit in the CPU body shown in each of FIGS. 1 and 10.

As shown in FIG. 2, the address circuit 109 has, as parts provided for the signals RGS0 through RGSn, circuits including inverters. The address circuit receives the RGS0 through RGSn, and supplies forward and inverse signals thereof (IA0 through IAn and IA0B through IAnB in FIG. 2). Further, the decoding circuit 110 has, as shown in FIG. 3, circuits made of four-input NAND circuits and inverters. The decoding circuit receives outputs (IA0 through IA3 and IA0B through IA3B in FIG. 3), and supplies decoded signals (RG0 through RG15 in FIG. 3).

The register-bank memory 102 includes:

the memory unit 113;

an address circuit 114 which receives the above-discussed signals RAn+1 through RAm;

a decoding circuit 115 which receives the forward and inverse outputs from the address circuit 114 and also receives the forward and inverse outputs from the address circuit 109 of the CPU body 101 (IA0 through IAn, IA0B through IAnB);

a control circuit 116 which receives the above-discussed signals including RBCK, RBCE and RBWEB and controls the address circuit 114; and an input/output circuit 117 which sends to and receives from the register-bank memory 102 the above-discussed signals RB0 through RBn.

Figure 4:
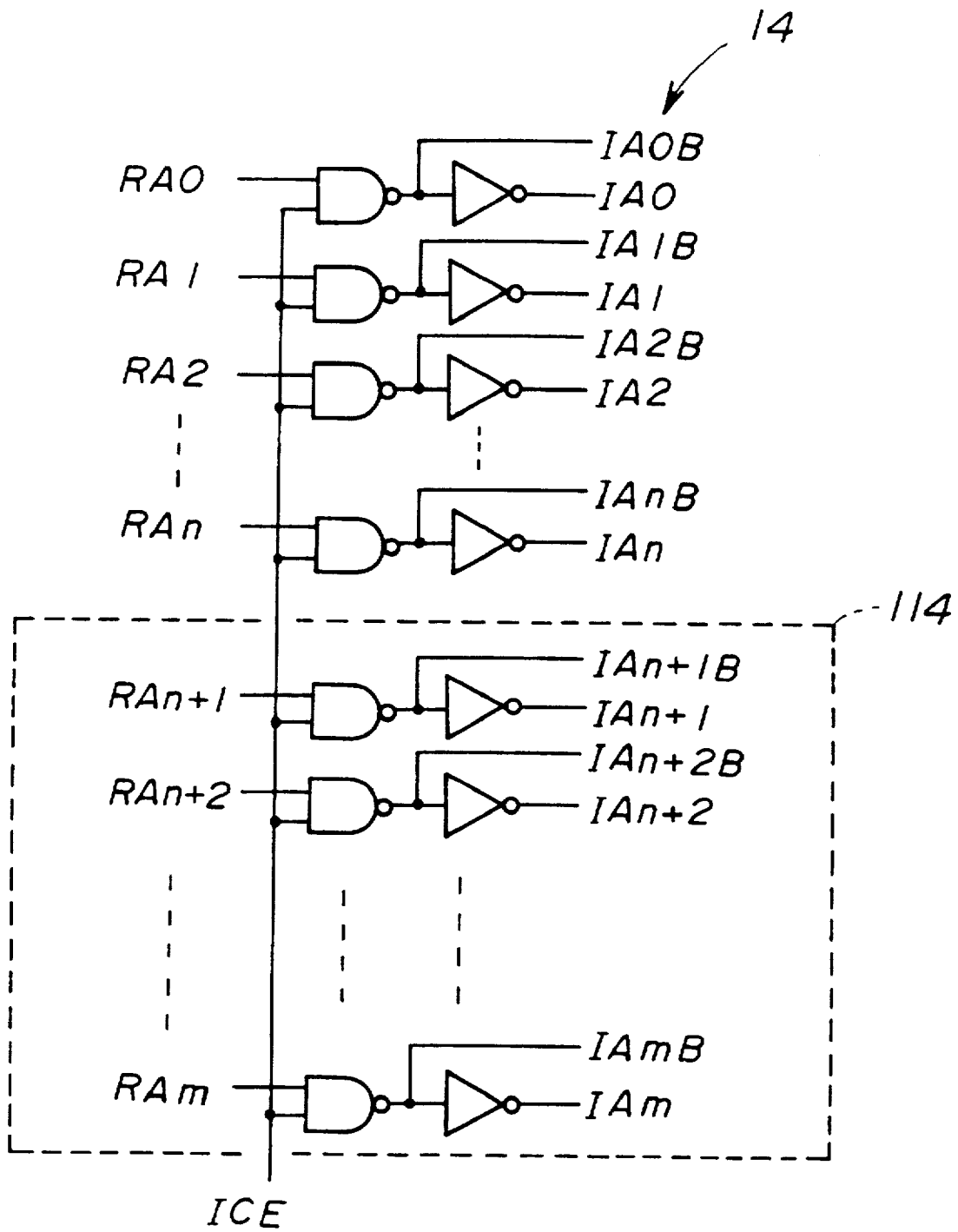
FIG. 4 shows a circuit diagram of an address circuit in a register-bank memory shown in FIG. 1.

The above-mentioned address circuit 114 includes, as shown in FIG. 4, circuits made of a NAND circuit and an inverter. However, the address circuit 114 includes only some circuits, among the circuits shown in FIG. 4, provided for the signals RAn+1 through RAm. The address circuit 114 receives from the above-discussed bank address buffer 108 the signals RAn+1 through RAm and supplies the forward and inverse signals thereof. Further, the signal ICE shown in FIG. 4 is supplied by the control circuit 116 and controls driving of the address circuit 114.

Figure 5:
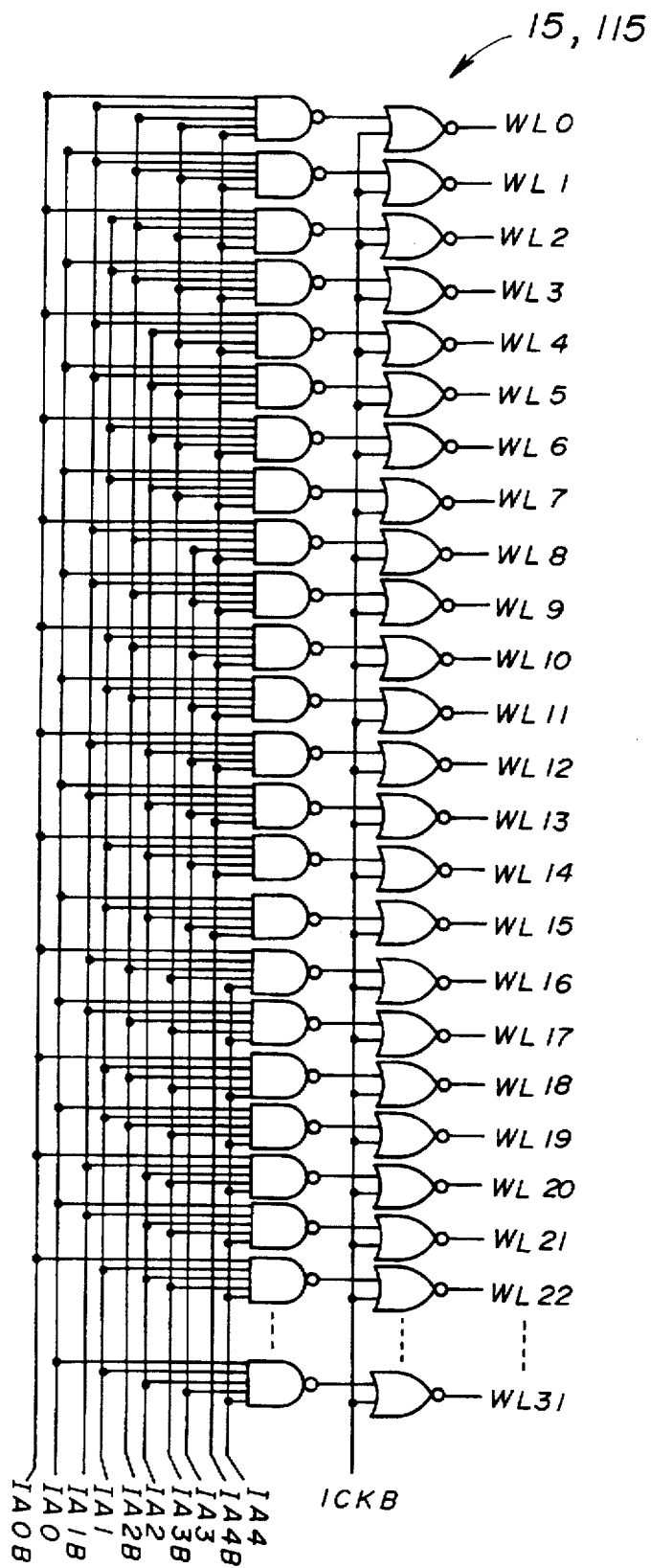
FIG. 5 shows a circuit diagram of a decoding circuit in the register-bank memory shown in FIG. 1.

The decoding circuit 115 comprises the circuits shown in FIG. 5, receives the forward and inverse signals from the address circuit 109, and also receives the forward and inverse signals (IA0 through IAn and IA0B through IAnB) from the address circuit 114 of the CPU body 101. The decoding circuit 115 generates decoded signals.

Figure 6:
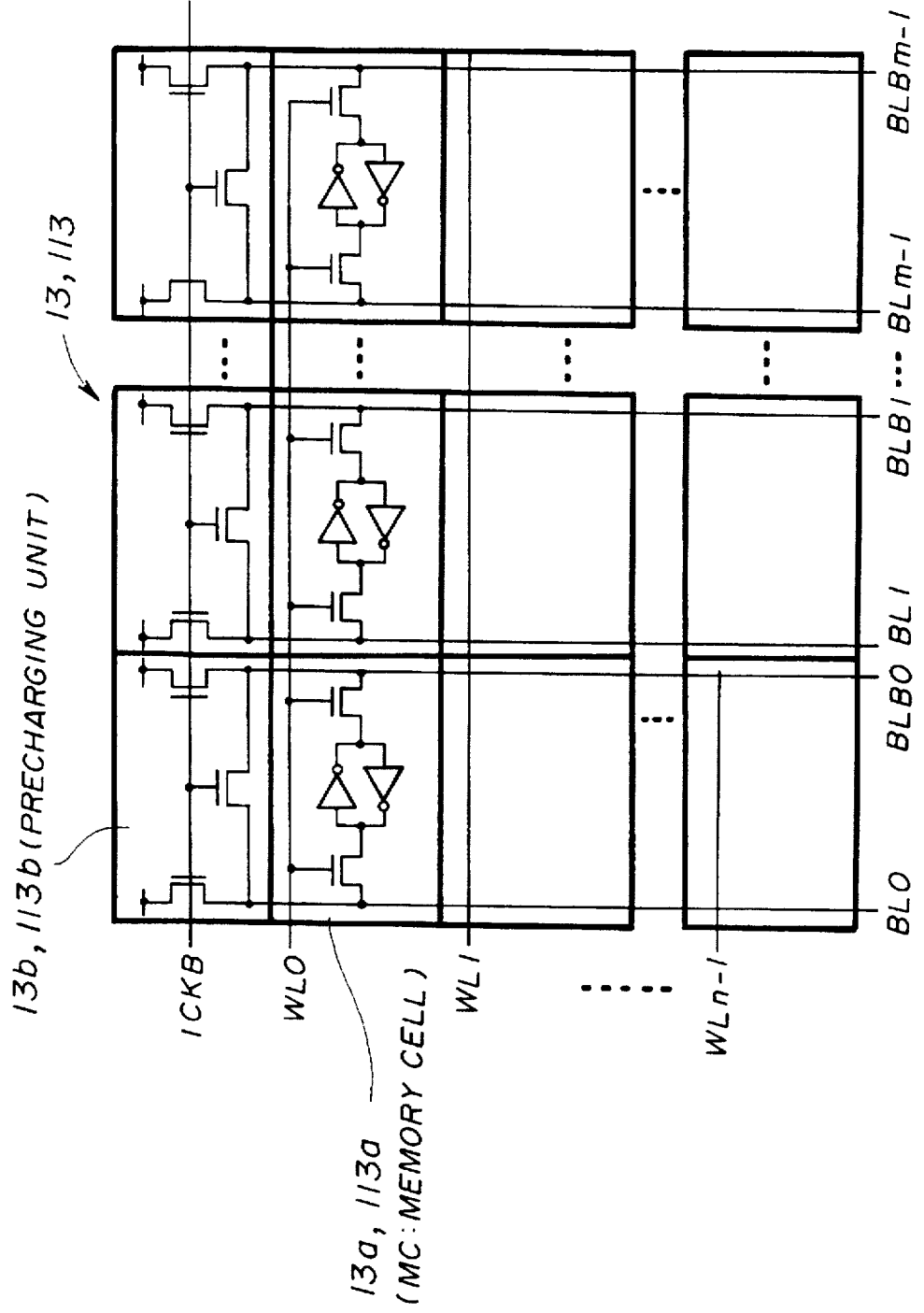
FIG. 6 shows a circuit diagram of a memory unit in the register-bank memory 2 shown in FIG. 1.

The memory unit 113 includes, as shown in FIG. 6, a memory-cell array unit 113a and a precharging unit 113b, and is provided with a memory space corresponding to the general-use register set 106. By using the memory space of the memory unit 113, it is possible to store, in the memory unit 113, data the same as that stored in the general-use register set 106. Further, the memory unit 113 sends to and receives from the decoding circuit 115 the decoded signals (WL0 through WLn−1 in FIG. 6), and sends to and receives from the input/output circuit 117 the signals BL0 through BLm−1, BLB0 through BLBm−1 in FIG. 6. The signal ICKB shown in FIG. 6 is supplied by the control circuit 116 and control the precharging.

Figure 7:
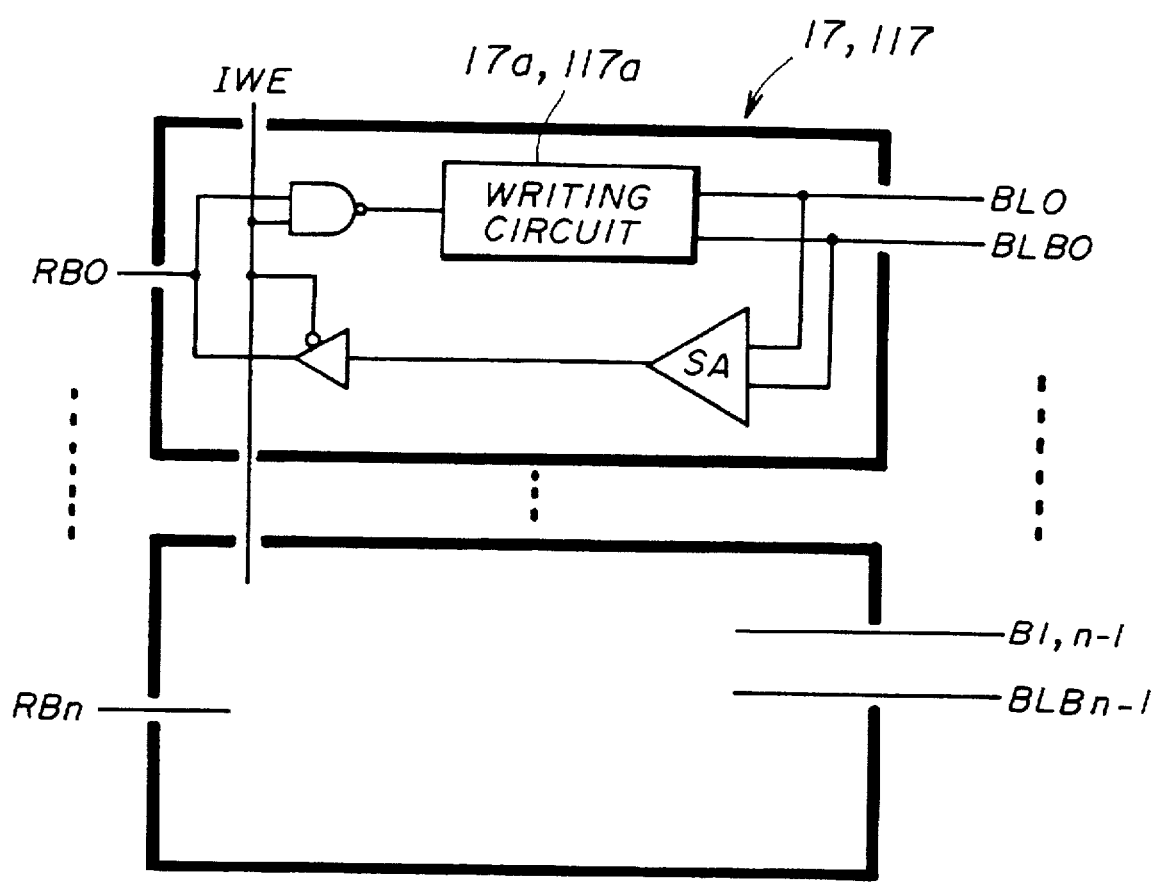
FIG. 7 shows a circuit diagram of an input/output circuit in the register-bank memory shown in FIG. 1.

The input/output circuit 117 includes, as shown in FIG. 7, a writing circuit 117a. The input/output circuit 117 sends to and receives from the memory unit 113 the signals BL0 through BLm−1, BLB0 through BLBm−1, and also sends to and receives from the input/output circuit 112 in the CPU body 101 data RB0 through RBn. The signal IWE shown in FIG. 7 is supplied by the control circuit 116 and controls reading/writing.

Figure 8:
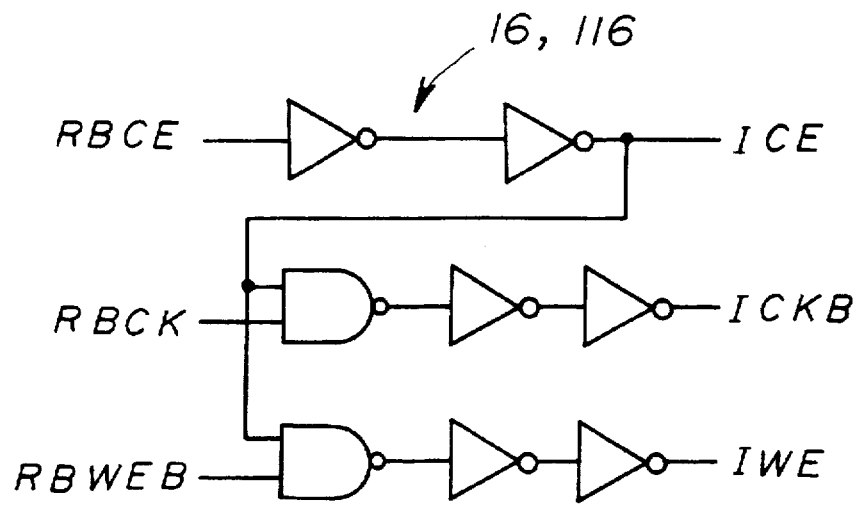
FIG. 8 shows a circuit diagram of a control circuit in the register-bank memory shown in FIG. 1.

The control circuit 116 includes, as shown in FIG. 8, NAND circuits and inverters, and receives from the command control unit 111 in the CPU body 1 the signals RBCK, RBCE and RBWEB, and outputs the control signals ICE, ICKB and IWE.

Figure 9:
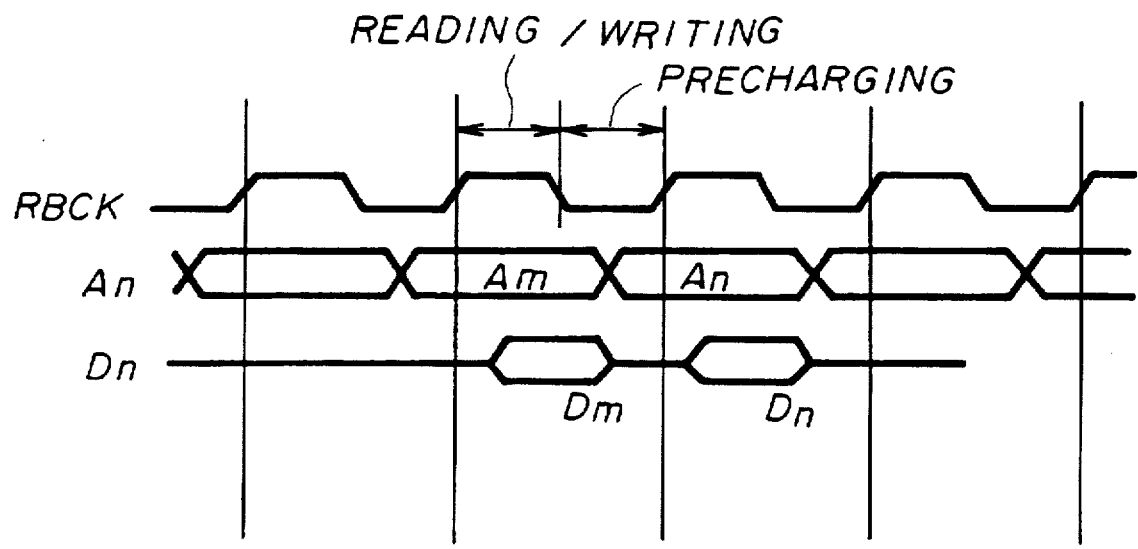
FIG. 9 shows a timing chart for reading/writing and precharging of the information processing apparatus shown in FIG. 1.

FIG. 9 shows the timing of reading/writing and precharging of the precharging unit 113b in the memory unit 113. When the signal RBCK from the CPU body 101 is at the low level, the signal ICKB is at the high level. Thereby, a high level is previously applied to lines BL0, BLB0, BL1, BLB1, ... and BLm−1, BLBm−1 shown in FIG. 6 and thus all of the memory cells (MC) are precharged Such a precharging operation is generally known in a technical field of RAM (Random Access Memory) technology. When the ICKB is at the high level, none of the signals WL0 through WLn−1 are selected (see FIG. 5). Further, when the signal RBCK is at the high level, according to a current address, one of the WL0 through WLn−1 is selected. If, in this state, the signal RBWEB is at the low level, the signal IWE is at the high level and a writing operation is performed on the memory cells. If, in the same state, the signal RBWEB is at the high level, the IWE signal is at the low level and a reading operation is performed on the memory cells.

In the above-described arrangement shown in FIG. 10, the signals RGS0 through RGSn are supplied to the address circuit 109 but are not supplied to the bank address buffer 108. Further, the address circuit 109 supplies the output signals (IA0B through IAnB, IA0 through IAn) not only to the decoding circuit 110 in the CPU body 101 but also to the decoding circuit 115 in the register-bank memory 102 via the internal address-signal bus 120.

Accordingly, the address circuit 114 in the register-bank memory 102 should not include the part, shown in FIG. 4, which receives the signals RA0 through RAn, while the address circuit 14 in the related art should include the part which receives the signals RA0 through RAn. As a result, power consumption required for the address circuit 114 in the first embodiment of the present invention can be less than that for the address circuit 14 in the related art. Further, it is also possible to miniaturize a chip area required for the information processing apparatus. The decoding circuit 115 includes a circuit arrangement the same as that of the decoding circuit 15 in the related art, receives the signals IA0B, ... from the address circuit 109 and signals IAn+1B, ... from the address circuit 114, and outputs the decoded signals.

An information processing apparatus in a second embodiment of the present invention will now be described with reference to FIGS. 11 and 12. For the sake of simplification, description of parts identical to those used in the above-described first embodiment will be omitted as much as possible.

Figure 11:
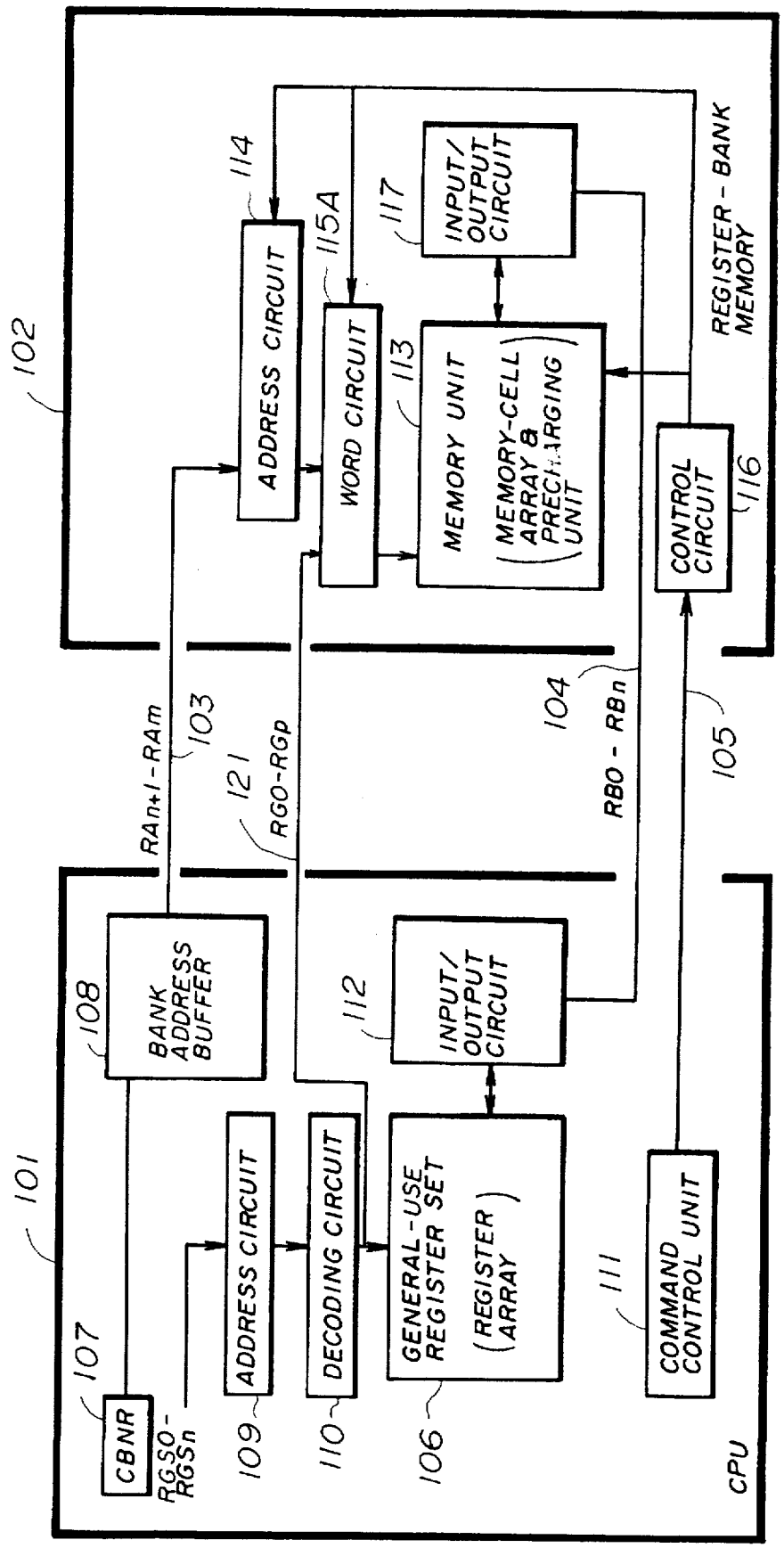
FIG. 11 shows a block diagram of an information processing apparatus in a second embodiment of the present invention.

In the information processing apparatus in the second embodiment, as shown in FIG. 11, the signals RGS0 through RGSn are supplied to the address circuit 109 but not to the bank address buffer 108. The address circuit 109 has circuits the same as those used in the address circuit 9 in the related art, and outputs the signals IA0B, .... Further, the decoding circuit 110 has circuits the same as those of the decoding circuit 10 in the related art, and outputs the decoded signals (RG0 through RGp in FIG. 11). However, these decoded signals are supplied not only to the general-use register set 106 but also to a word circuit 115A of the register-bank memory 102 via an internal decoded-signal bus 121 as shown in FIG. 11.

Accordingly, the address circuit 114 does not include a part, in the arrangement shown in FIG. 4, which receives the signals RA0 through RAn, while the address circuit 14 in the related art should include the same part which receives the signals RA0 through RAn.

Figure 12:
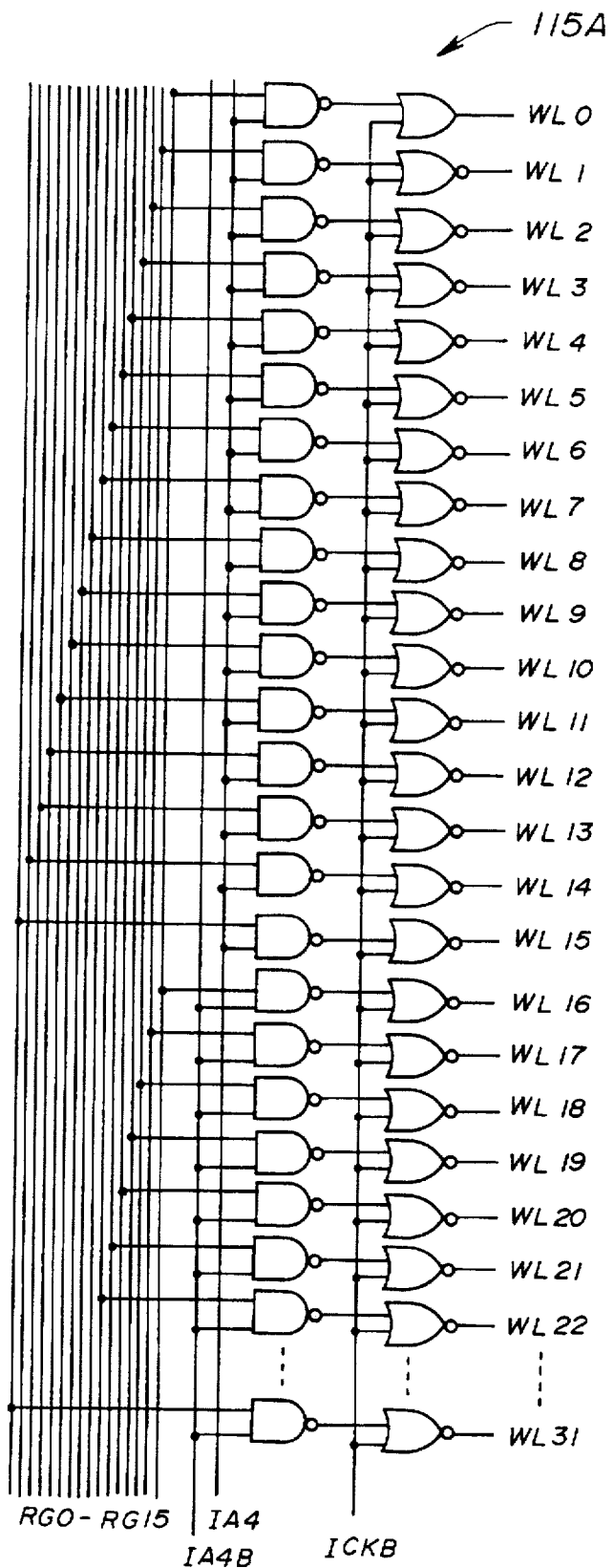
FIG. 12 shows a circuit diagram of a decoding circuit in the information processing apparatus in the second embodiment.

Further, as shown in FIG. 12, the word circuit 115A has a circuit arrangement such that the word circuit 115A directly receives the decoded signals (RG0 through RG15 in FIG. 12) from the decoding circuit 110 and the signals IA4 and IA4B from the address circuit 114. Accordingly, each of the NAND circuits included in the word circuit 115A can be of the two-input type and have an input terminal for receiving the signal IA4 or IA4B, and the other input terminal for receiving one of the signals RG0 through RG15.

In the second embodiment, each of the NAND circuits included in the word circuit 115A can be of the two-input type while each of the NAND circuits included in the decoding circuit 15 used in each of the related art and the first embodiment is of the four-input type as shown in FIG. 5. Thus, it is possible to reduce the power consumption and to reduce the chip area.

An information processing apparatus in a third embodiment of the present invention will now be described. This embodiment can have hardware the same as either one of the information apparatus in the first embodiment shown in FIG. 10 and the second embodiment shown in FIGS. 11 and 12. However, the command control unit 111 supplies the control signal RBCE (memory enable) for selecting one of activation and deactivation of the memory-bank memory 102 in a manner which will now be described.

In the related art, the control signal RBCE is maintained to be at the high level during the register accessing operation (reading operation, writing operation). However, in the third embodiment, the CPU body 101 causes the control signal RBCE to be at the low level (indicating deactivation of the register-bank memory 102) except in a case where data is written in the general-use register set 106 and when there is a restoration operation after the register bank switching. The control signal RBCE is generated by a microcode control unit and/or a peripheral circuit inside the CPU body 101. The microcode control unit is a main decoder which has microcode (a sort of software program) stored therein.

An operation of the register bank switching is an operation performed for the purpose that data currently being stored in the general-use register set 106 and currently being used is switched to other new data stored in a new bank of externally provided memory. According to the register bank memory method which is used in this embodiment, the currently stored data is regularly stored in a bank of the memory unit 103 of the register-bank memory 102. Therefore, only loading the new data in the general-use register set 106 can achieve the register bank switching. The above-mentioned restoration operation after the register bank switching is an operation that data, having been saved in the bank in the memory unit 113 of the register-bank memory 102, is loaded in the general-use register set 106 after an operation using the new data has been finished.

When the control signal RBCE is at the low level, each of the decoding circuit 115, memory unit 113 and input/output circuit 117 is deactivated. Accordingly, in the case of an ordinary data reading operation of reading data from the general-use register set 106, a reading operation is performed only on the general-use register set 106 but is not performed on the register-bank memory 102. Thus, wasteful power consumption can be eliminated.

An information processing apparatus in a fourth embodiment of the present invention will now be described. This embodiment can have hardware the same as either of the information apparatus in the first embodiment shown in FIG. 10 or that in the second embodiment shown in FIGS. 11 and 12. However, the command control unit 111 supplies the control signal RBCK for selecting one of generation and non-generation of a clock signal for the register-bank memory 102 in a manner which will now be described.

In the fourth embodiment, the CPU body 101 causes the control signal RBCK to be at the low level (indicating non-generation of the clock signal for the register-bank memory 102) except in a case where data is written in the general-use register set 106 and in a case of the restoration operation after the register bank switching. The control signal RBCK is generated by the microcode control unit and/or the peripheral circuit provided inside the CPU body 101.

When the control signal RBCK is at the low level, each of the decoding circuit 115, memory unit 113 and input/output circuit 117 is deactivated. Accordingly, in the case of an ordinary data reading operation of reading data from the general-use register set 106, a reading operation is performed only on the general-use register set 106 and is not performed on the register-bank memory 102. Thus, wasteful power consumption can be eliminated.

Figure 13:
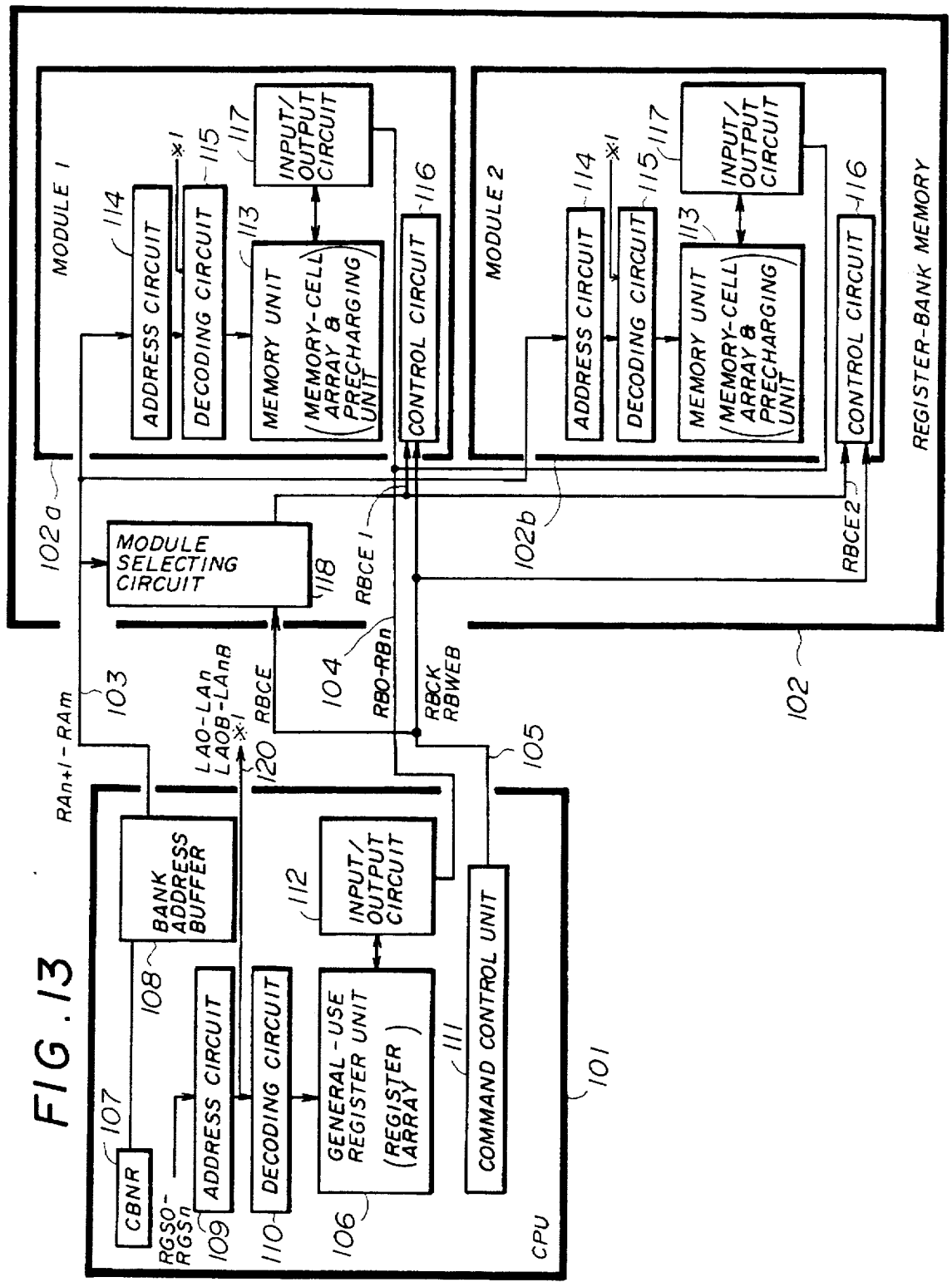
FIG. 13 shows a block diagram of an information processing apparatus in a fifth embodiment of the present invention.

An information processing apparatus in a fifth embodiment of the present invention will now be described with reference to FIG. 13. This information processing apparatus has two banks of register-bank memory, 102a (referred to as module 1) and 102b (referred to as module 2), as a result of dividing the register-bank memory 102 in the first embodiment shown in FIG. 10. This division is such that a bank of the register-bank memory 102 is included in the module 1 and the other bank is included in the module 2. Each module of the modules 102a and 102b includes the memory unit 113, address circuit 114, decoding circuit 115, control circuit 116 and input/output circuit 117. One of the two modules 102a and 102b is selected by a module selecting circuit 118.

Figure 14:
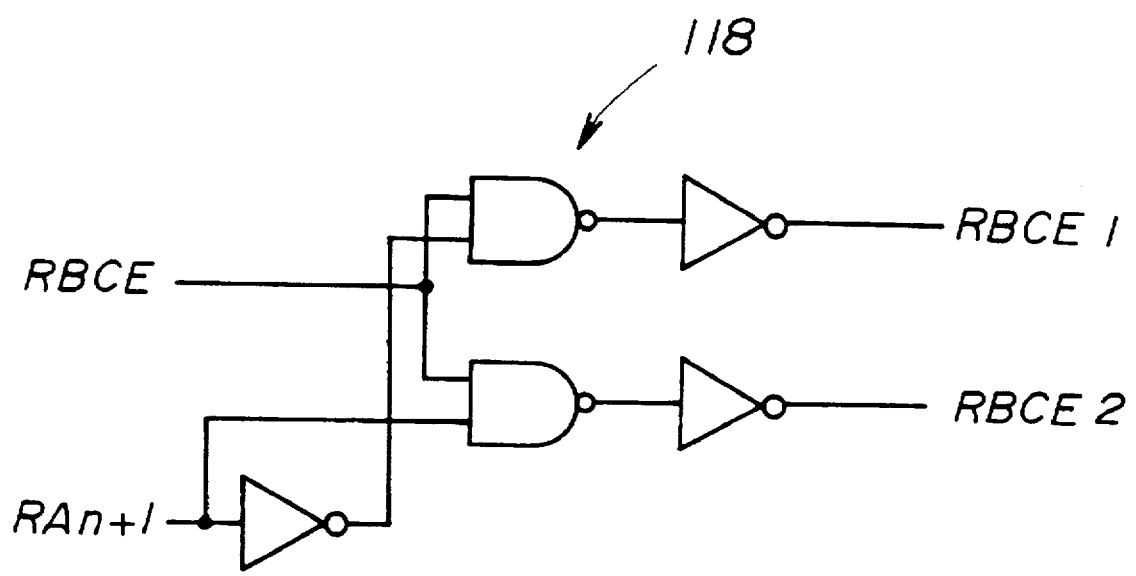
FIG. 14 shows a block diagram of a module selecting circuit in the information processing apparatus in the fifth embodiment.

With reference to FIG. 14, the module selecting circuit 118 will now be described. The module selecting circuit 118 receives the control signal RBCE and the signal RAn+1 (an address indicating a register bank number) from the CPU body 101, and generates signals RBCE1 and RBCE2, as shown in FIG. 14. These two signals RBCE1 and RBCE2 are such that when one of the two signals RBCE1 and RBCE2 is at the high level, the other signal is at the low level. The signal RBCE1 is supplied to the module 1 (102a), the signal RBCE2 is supplied to the module 2 (102b), and selection of one module therebetween is performed.

Further, similar to the first embodiment, the output signals IA0B, . . . of the address circuit 109 is supplied not only to the decoding circuit 110 but also to the decoding circuits 115 in the register-bank memory 102 via the internal bus 120. Thus, similar to the case of the first embodiment, the address circuit 115 in each of the modules 102a and 102b should not include the part which receives the signals RA0 through RAn. The part is included in the corresponding circuit in the related art. Each of the decoding circuits 115 has a circuit arrangement which is the same as that of the corresponding circuit in the related art and receives the signals IA0B, . . . from the address circuit 109 of the CPU body 101 and the signals IAn+1, . . . from the address circuit 114 in a respective one of the modules 102a and 102b, and outputs the decoded signals.

By the above-described arrangement, the required chip area increases due to the provision of two modules of register-bank memory. However, only a module of a bank which is currently accessed is activated and the other module is not activated. Accordingly, it is possible to reduce the required power consumption. Further, similar to the case of the first embodiment, it is possible that the address circuits 114 does not include the part which receives the signals RA0 through RAn. Accordingly, the required power consumption can be reduced and the required chip area can be reduced in comparison to a case where only two modules of register-bank memory are provided.

The fifth embodiment includes two banks of the register-bank memories 102, that is, each bank is included in a respective one of the two modules 102a and 102b. However, it is also possible to include more than two banks of the register-bank memory 102 as a result of appropriately dividing the register-bank memory in a manner in which some banks are included in a module and the other remaining banks are included in the other module. For example, the register-bank memory may have three banks, that is, each bank is included in a respective one of three modules. Further, it is also possible to provide four banks of register-bank memory and thus four modules or two modules. That is, each bank may be included in a respective one of the two modules, or some banks may be included in one module and the other in the other module. Further, it is also possible to provide a plurality of banks of register-bank memory and thus a plurality of modules. That is, each bank may be included in a respective one of the plurality of modules, or some banks may be included in one module and the other in the other modules as long as the entirety of each bank is included in any single module.

Further, it is also possible to combine the features of the present invention embodied in each of the above-described third and fourth embodiments with the features of the present invention embodied in the fifth embodiment. Specifically, the fifth embodiment can be modified so that the command control unit 111 controls levels of the control signal RBCE or RBCK.

Figure 15:
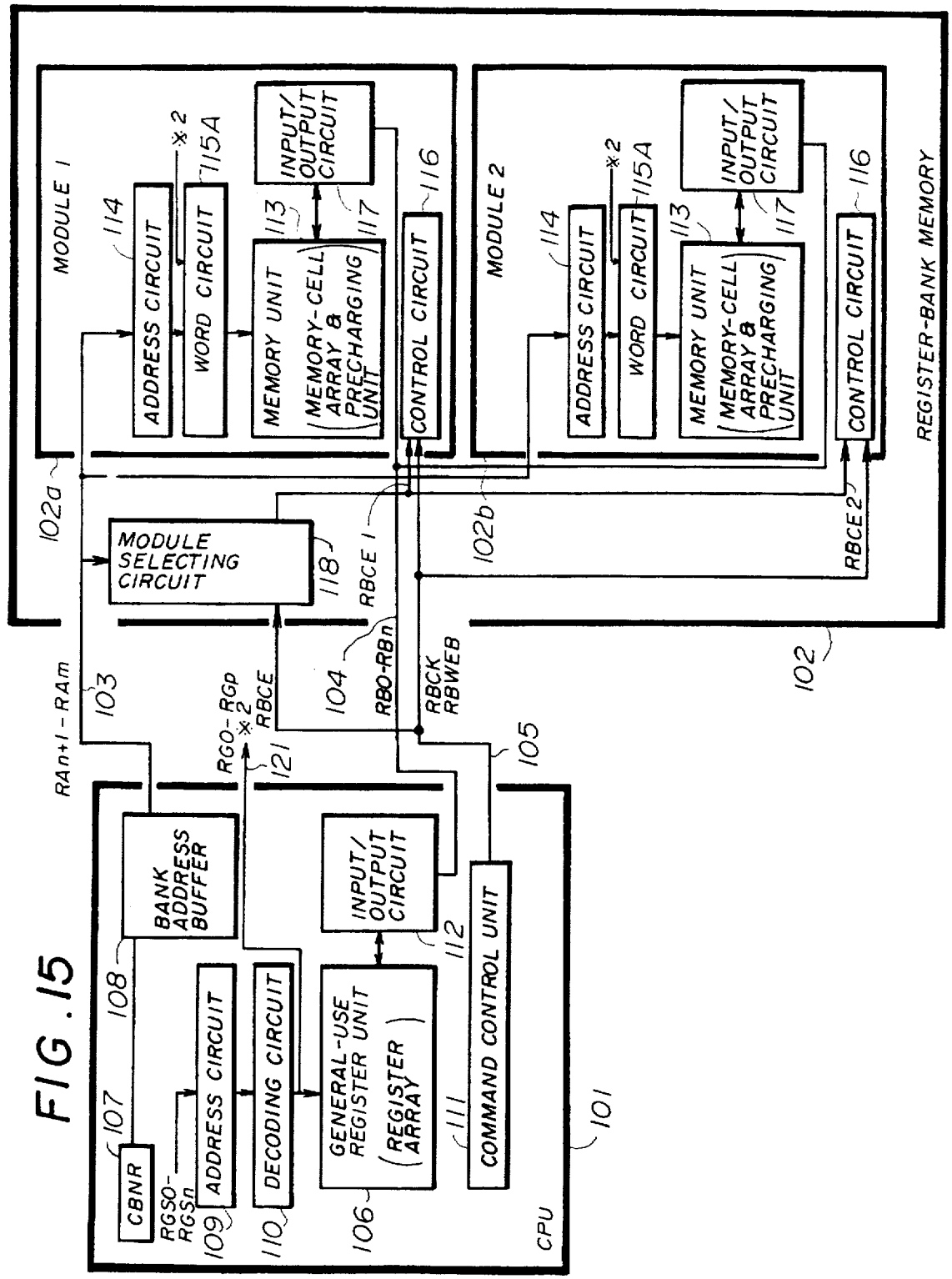
FIG. 15 shows a block diagram of an information processing apparatus in a sixth embodiment of the present invention.

An information processing apparatus in a sixth embodiment of the present invention will now be described with reference to FIG. 15. As shown in the figure, this information processing apparatus has two banks of register-bank memory, 102a (referred to as module 1) and 102b (referred to as module 2), as a result of dividing the register-bank memory 102 in the first embodiment shown in FIG. 10. This division is performed in a manner in which some banks of the register-bank memory 102 are included in the module 1 and the other remaining banks are included in the module 2. Each module of the modules 102a and 102b includes the memory unit 113, address circuit 114, word circuit 115A, control circuit 116 and input/output circuit 117. One of the two modules 102a and 102b is selected by the module selecting circuit 118. The module selecting circuit 118 is the same as the corresponding circuit used in the above-described fifth embodiment.

Further, similar to the second embodiment, the decoding circuit 110 has a circuit arrangement the same as that of the corresponding circuit in the related art, and outputs the decoded signals (RG0 through RGp in the figure). The thus-output decoded signals are supplied not only to the general-use register set 106 but also to the work circuit 115A in each of the modules 102a and 102b via the internal bus 121.

Therefore, the address circuit 114 in each module of the register-bank memory 102 should not include the part which receives the signals RA0 through RAn. The part is included in the corresponding circuit in the related art. Further, as shown in FIG. 12, the word circuit 115A in each module directly receives the decoded signals (RG0 through RGp) and also receives the signals IA4 and IA4B from the address circuit 114 in the same module. Thus, the circuit arrangement of each of the work circuits 115A can be simplified by the same reason as that in the case of the second embodiment.

By the above-described arrangement, the required chip area increases due to provision of two modules of register-bank memory. However, only a module of banks including a bank which is currently accessed is activated and the other module is not activated. Accordingly, it is possible to reduce a required power consumption. Further, similar to the case of the second embodiment, it is possible that the address circuits 114 does not include the part which receives the signals RA0 through RAn. Further, the circuit arrangements of the work circuits 115A can be simplified. Accordingly, the required power consumption can be reduced and the required chip area can be reduced in comparison to a case where only two modules of register-bank memory are provided.

Although the fifth embodiment includes two banks of the register-bank memories 102, that is, two modules, 102a and 102b, it is also possible to include more than two banks of the register-bank memory 102 as a result of appropriately dividing the register-bank memory in a similar manner. For example, the register-bank memory may be three banks, that is, three modules. Further, it is also possible to provide four banks of register-bank memory and thus four modules or two modules. Further, it is also possible to combine the features of the present invention embodied in each of the above-described third and fourth embodiments with the features of the present invention embodied in the fifth embodiment. Specifically, the fifth embodiment can be modified so that the command control unit 111 controls levels of the control signal RBCE or RBCK.

Figure 1:
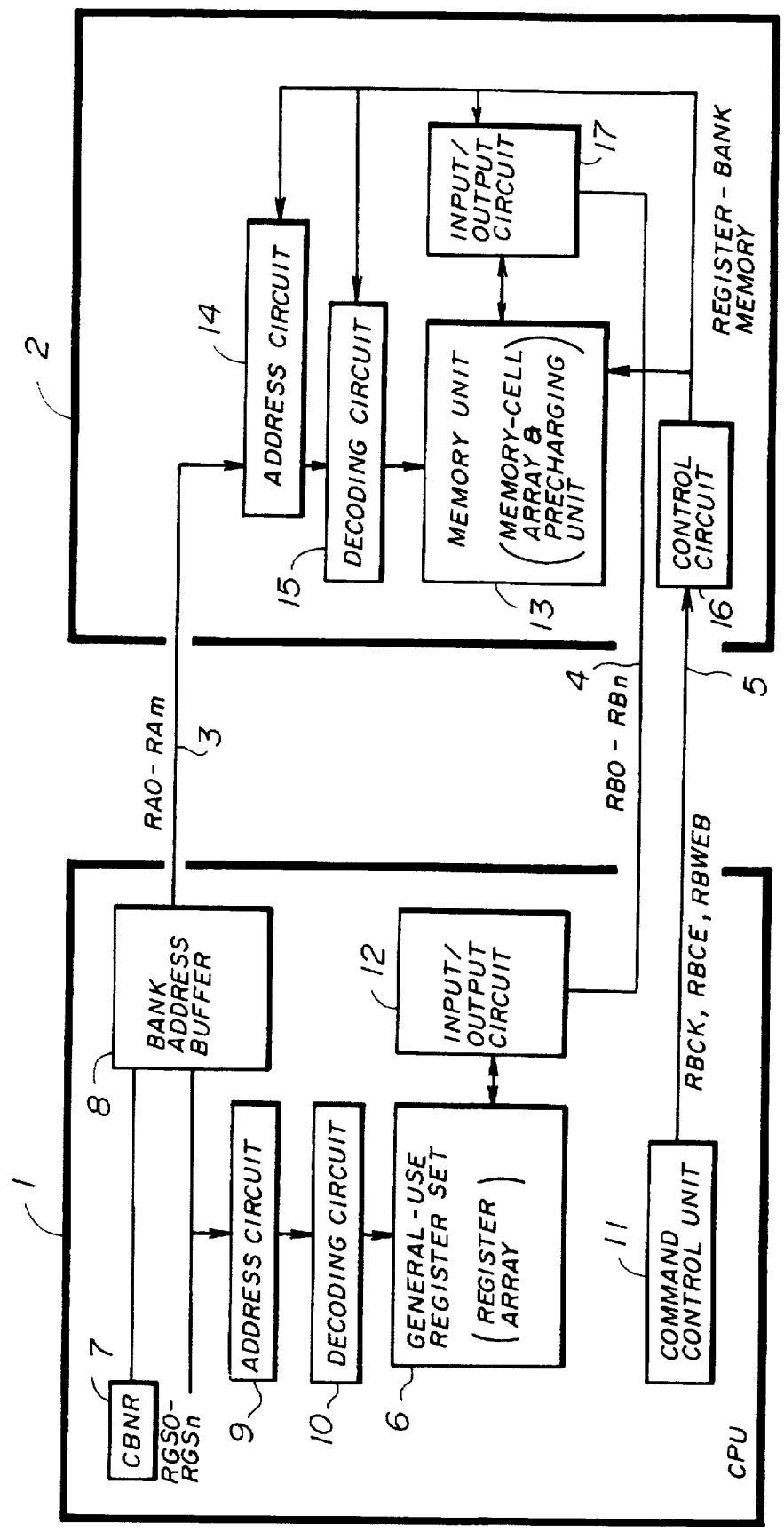
FIG. 1 shows a block diagram of an information processing apparatus in the related art.

An information processing apparatus in a seventh embodiment of the present invention will now be described with reference to FIG. 1 used in the description of the related art. However, in a manner similar to that in the third embodiment, the command control unit 11 supplies the control signal RBCE (memory enable) for selecting one of activation and deactivation of the memory-bank memory 2 in a manner which will now be described.

In the related art, as described above, this control signal RBCE is maintained to be at the high level during the register accessing operation (reading operation, writing operation). However, in the seventh embodiment, the CPU body 1 causes the control signal RBCE to be at the low level (indicating deactivation of the register-bank memory 2) except in a case where data is written in the general-use register set 6 and in a case of a restoration operation after the register bank switching. The control signal RBCE is generated by the microcode control unit and/or the peripheral circuit inside the CPU body 1.

When the control signal RBCE is at the low level, each of the decoding circuit 15, memory unit 13 and input/output circuit 17 is deactivated. Accordingly, in the case of an ordinary data reading operation of reading data from the general-use register set 6, a reading operation is performed only on the general-use register set 6 but is not performed on the register-bank memory 2. Thus, wasteful power consumption can be eliminated.

An information processing apparatus in a eighth embodiment of the present invention will now be described. This embodiment can have hardware the same as that of the information apparatus in the related art shown in FIG. 1. However, in a manner similar to that in the fourth embodiment, the command control unit 11 supplies the control signal RBCK for selecting one of generation and non-generation of a clock signal for the register-bank memory 2 in a manner which will now be described.

In the fourth embodiment, the CPU body 1 causes the control signal RBCK to be at the low level (indicating non-generation of the clock signal for the register-bank memory 2) except in a case where data is written in the general-use register set 6 and in a case of the restoration operation after the register bank switching. The control signal RBCK is generated by the microcode control unit and/or the peripheral circuit provided inside the CPU body 1.

When the control signal RBCK is at the low level, each of the decoding circuit 15, memory unit 13 and input/output circuit 17 is deactivated. Accordingly, in the case of an ordinary data reading operation of reading data from the general-use register set 6, a reading operation is performed only on the general-use register set 6 but is not performed on the register-bank memory 2. Thus, wasteful power consumption can be eliminated.

Figure 16:
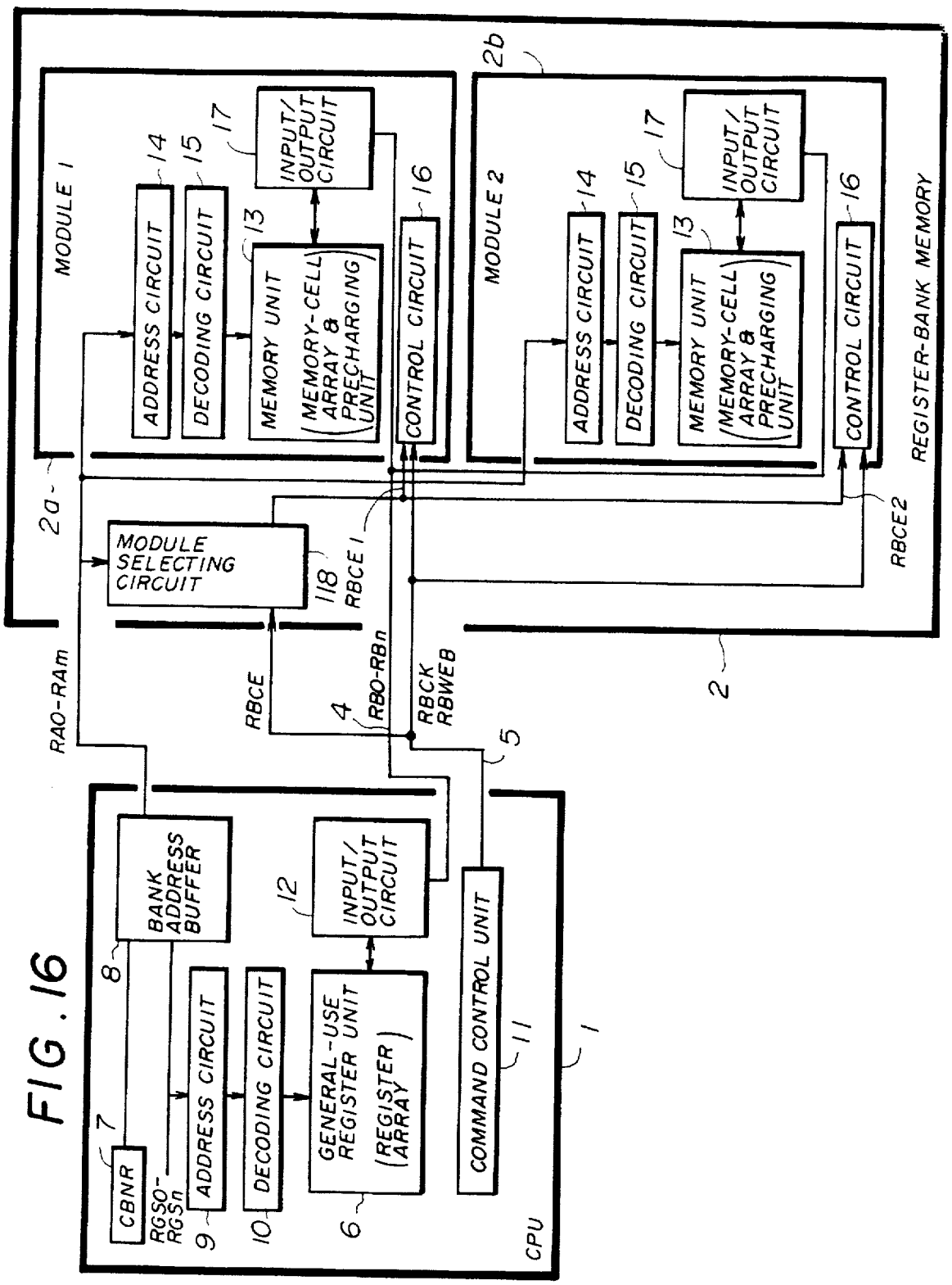
FIG. 16 shows a block diagram of an information processing apparatus in a ninth embodiment of the present invention.

An information processing apparatus in a ninth embodiment of the present invention will now be described with reference to FIG. 16. This information processing apparatus includes the CPU body 1 which has hardware the same as that of the related art shown in FIG. 1. However, as shown in FIG. 16, the information processing apparatus in the ninth embodiment of the present invention has two banks of register-bank memory, 2a (referred to as module 1) and 2b (referred to as module 2), as a result of dividing the register-bank memory 2 in the related art shown in FIG. 1. This division is such that some banks of the register-bank memory 2 are included in the module 1 and the other remaining banks are included in the module 2. Each module of the modules 2a and 2b includes the memory unit 13, address circuit 14, decoding circuit 15, control circuit 16 and input/output circuit 17. One of the two modules 2a and 2b is selected by the module selecting circuit 118.

Similar to the corresponding circuit in the fifth embodiment shown in FIG. 14, the module selecting circuit 118 in the ninth embodiment receives the control signal RBCE and the signal RAn+1 (an address indicating a register bank number) from the CPU body 1, and generates signals RBCE1 and RBCE2. These two signals RBCE1 and RBCE2 are such that when one of the two signals RBCE1 and RBCE2 is at the high level, the other one is at the low level. The signal RBCE1 is supplied to the module 1 (2a), the signal RBCE2 is supplied to the module 2 (2b), and selection of one module is performed.

Further, similar to the first embodiment, the output signals IA0B, . . . of the address circuit 109 is supplied not only to the decoding circuit 110 but also to the decoding circuits 115 in the register-bank memory 102 via the internal bus 120. Thus, similar to the case of the first embodiment, the address circuit 115 in each of the modules 102a and 102b should not include the part which receives the signals RA0 through RAn, the part being included in the corresponding circuit in the related art. Each of the decoding circuits 115 has a circuit arrangement the same as that of the corresponding circuit in the related art, receives the signals IA0B, . . . from the address circuit 109 of the CPU body 101 and the signals IAn+1, . . . from the address circuit 114 in a respective one of the modules 102a and 102b, and outputs the decoded signals.

Although the ninth embodiment includes two banks of the register-bank memories 2, that is, two modules, 2a and 2b, it is also possible to include more than two banks of the register-bank memory 2 as a result of appropriately dividing the register-bank memory in a similar manner. For example, the register-bank memory may be three banks, that is, three modules. Further, it is also possible to provide four banks of register-bank memory and thus four modules or two modules. Further, it is also possible to combine the features of the present invention embodied in each of the above-described seventh and eighth embodiments with the features of the present invention embodied in the ninth embodiment.

Specifically, the ninth embodiment can be modified so that the command control unit 111 controls levels of the control signal RBCE or RBCK.

Further, the present invention is not limited to the above-described embodiments, and variations and modifications may be made without departing from the scope of the present invention.

What is claimed is:

1. An information processing apparatus, comprising:

a general-use register set comprising a plurality of registers in a central processing unit body;

an address circuit provided in said central processing unit body and used for accessing said general-use register set; and a register-bank memory unit separate from the central processing unit body, used as at least one of complementary and optional storage of the general use register set and having memory regions corresponding to said plurality of registers and electrically connected to said central processing unit body;

and wherein an output signal of said address circuit included in said central processing unit body and used for accessing the general-use register set is supplied to said register-bank memory and used to also access the memory regions of said register bank memory unit.

2. The information processing apparatus according to claim 1, wherein a signal for selecting one of activation and deactivation of said register-bank memory is a signal which indicates a selection of the deactivation of said register-bank memory except when data is written in said general-use register set and when a restoration operation occurs after register bank switching.

3. The information processing apparatus according to claim 1, wherein a signal for selecting one of generating and non-generating of a clock signal for said register-bank memory is a signal which indicates a selection of the non-generation of the clock signal for said register-bank memory excepting a case where data is written in said general-use register set and a case of a restoration operation after register bank switching.

4. The information processing apparatus according to claim 1, wherein:

said register-bank memory is divided into a plurality of modules; and said information processing apparatus further comprises module selecting means for deactivating a module of said plurality of modules, said module to be deactivated being one which is currently unaccessed.

* * * * *